United States Patent
Chauvin et al.

(10) Patent No.: US 10,131,074 B2
(45) Date of Patent: Nov. 20, 2018

(54) CONTAINER-FABRICATING APPARATUS AND A METHOD FOR THE CLEANING THEREOF

(71) Applicant: DISCMA AG, Zürich (CH)

(72) Inventors: Guillaume Chauvin, Duchess Manor (SG); Christophe Collin, Fuveau (FR); Damien Kannengiesser, Golbey (FR); Jean-Tristan Outreman, Septemes les Vallons (FR); Jean-Louis Pellegatta, Seillons Source d'Argens (FR)

(73) Assignee: Discma AG, Zürich (CH)

( * ) Notice: Subject to any disclaimer, the term of this patent is extended or adjusted under 35 U.S.C. 154(b) by 76 days.

(21) Appl. No.: 14/902,683

(22) PCT Filed: Jul. 1, 2014

(86) PCT No.: PCT/EP2014/063940
§ 371 (c)(1),
(2) Date: Jan. 4, 2016

(87) PCT Pub. No.: WO2015/000887
PCT Pub. Date: Jan. 8, 2015

(65) Prior Publication Data
US 2016/0167257 A1    Jun. 16, 2016

(30) Foreign Application Priority Data
Jul. 2, 2013 (EP) .................................... 13174788

(51) Int. Cl.
*B29C 33/72* (2006.01)
*B29C 49/12* (2006.01)
(Continued)

(52) U.S. Cl.
CPC .............. *B29C 33/72* (2013.01); *B29C 49/12* (2013.01); *B29C 49/46* (2013.01); *B29C 49/58* (2013.01);
(Continued)

(58) Field of Classification Search
None
See application file for complete search history.

(56) References Cited

U.S. PATENT DOCUMENTS

| 2007/0074783 | A1 | 4/2007 | Stocchi |
| 2009/0095370 | A1 | 4/2009 | Krulitsch |
| 2012/0164258 | A1 | 6/2012 | Dordoni |

FOREIGN PATENT DOCUMENTS

| DE | 102006017706 A1 * | 10/2007 | ............. B67C 3/004 |
| WO | WO 2011030183 A1 * | 3/2011 | ............. B29C 49/12 |

* cited by examiner

*Primary Examiner* — Eric W Golightly
(74) *Attorney, Agent, or Firm* — Eric J. Sosenko; Jonathan P. O'Brien; Honigman Miller Schwartz and Cohn LLP

(57) ABSTRACT

A container-fabricating apparatus having an injection head establishing fluid communication between an injection fluid port disposed therein and a preform disposed in communication with a nozzle of the injection head. The apparatus also including a stretching rod moveable between a position projecting from the injection head through the nozzle and a substantially retracted position. The apparatus further includes a cleaning chamber at least partially defined by a hollow, elongate housing contiguous with and extending from the injection head, a plurality of cleaning chamber ports in a wall of the housing establishing fluid communication with the cleaning chamber, the stretching rod being substantially disposed within the cleaning chamber when disposed in the substantially retracted position.

7 Claims, 3 Drawing Sheets

(51) Int. Cl.
  *B29C 49/46* (2006.01)
  *B29C 49/58* (2006.01)
  *B29C 49/42* (2006.01)
(52) U.S. Cl.
  CPC .. *B29C 49/4289* (2013.01); *B29C 2049/1295* (2013.01); *B29C 2049/465* (2013.01); *B29C 2049/4694* (2013.01); *B29C 2049/5803* (2013.01); *B29C 2049/5817* (2013.01)

CONTAINER-FABRICATING APPARATUS AND A METHOD FOR THE CLEANING THEREOF

CROSS-REFERENCE TO RELATED APPLICATIONS

This application is the U.S. national phase of PCT Application No. PCT/EP2014/063940 filed on Jul. 1, 2014, which claims priority to EP13174788.3 filed on Jul. 2, 2013, the disclosures of which are incorporated in their entirety by reference herein.

TECHNICAL FIELD

The invention relates to a container-fabricating apparatus. Specifically, the invention relates to such an apparatus as provided with a means for facilitating the cleaning thereof. The invention further relates to a method for cleaning an apparatus so configured.

BACKGROUND OF THE INVENTION

It is generally well known in the art to fabricate containers by the process of blow molding, wherein a plastic parison known as a "preform" is molded into a container. This preform is generally provided in the form of an elongated tube which defines a preform cavity and which is provided with a closed distal end and a mouth at an open proximal end in communication with the preform cavity.

During the molding process, the preform is placed in a mold which defines a mold cavity with the form of a container. The mold is provided in at least two segments, ideally configured such that the open proximal end of the preform protrudes from the mold while a majority of the preform remains within the mold cavity. A pressurized fluid is then injected into the preform cavity, which induces it to expand. The preform is thus expanded into the contours of the mold, forming a container.

Advantageously, a stretching rod is also employed during the molding process: during the injection of the pressurized fluid a rigid rod is inserted into the mouth of the preform along a longitudinal axis of the latter so as to contact the interior surface of the closed end, and then further advanced to induce the preform to plastically deform along its longitudinal axis. By controlling the rate of advancement of the stretching rod and the rate of injection of the pressurized fluid, one may exercise a great deal of control over the expansion of the preform. The containers so produced are thus generally of high quality and consistency.

The apparatuses carrying out this process generally comprise an injection head, which includes a nozzle to establish fluid communication between the mouth of the preform and a fluid supply; a valve or valves for controlling the flow of the fluid from the injection head to the cavity of the preform; the stretching rod, arranged coaxially with and mobile relative to the nozzle; and various channels for conducting the pressurized fluid from the fluid supply to the cavity of the preform. The stretching rod, in particular, is configured so as to extend and retract from the injection head during the operation of the injection apparatus.

Traditionally, the pressurized fluid utilized to expand the preform into a container is pressurized air; after being formed, the containers are removed for filling on a separate apparatus. However, it has recently become known to inject a liquid product into the preform, the liquid product remaining in the resulting container and being sealed therein for distribution. This is desirable in that a container is thereby formed and filled in a single step by a single machine, realizing considerable economies of space and time in its production.

However, it is very important to maintain the injection head at a high level of cleanliness, especially where the containers being fabricated are filled with a food, beverage, medicine, or other perishable product. It is moreover especially important to maintain the stretching rod in a high state of cleanliness; the stretching rod is inserted into the container, and thus could potentially insert microorganisms or other contaminants directly into the container if its cleanliness is not assiduously maintained.

This is problematic, in that cleaning, and maintaining the cleanliness of, the molding apparatuses known in the art is difficult. In particular, the environment within the injection head may become such that it promotes the growth of microorganisms upon the stretching rod, the stretching rod being retracted into the injection head at the end of each container fabrication cycle.

Cleaning the stretching rod is difficult, in that it requires one to halt the production of containers and extend the stretching rod from the injection head so that it may be cleaned. Depending on the design of the injection head, it may even be necessary to dismantle and disassemble the injection head to fully clean the stretching rod to an acceptable degree.

It is thus an objective of this invention to furnish an injection head for a container-fabricating apparatus which may be quickly, easily, and economically cleaned, as well as a method for performing such cleaning.

SUMMARY OF THE INVENTION

In a first aspect of the invention, there is provided a container-fabricating apparatus comprising an injection head configured to establish fluid communication between an injection fluid port disposed in the injection head and a substantially tubular preform disposed in communication with a nozzle of the injection head, and a stretching rod disposed at least partially within the injection head, the stretching rod being mobile between a substantially extended position wherein it projects from the injection head through the nozzle and a substantially retracted position.

According to the invention, the apparatus further comprises an elongate cleaning chamber at least partially defined by a hollow, elongate housing contiguous with the injection head and extending therefrom, a plurality of cleaning chamber ports being provided in a wall of the housing so as to establish fluid communication with the cleaning chamber, the stretching rod being substantially disposed within the cleaning chamber when disposed in the substantially retracted position.

This is advantageous in that the provision of the cleaning chamber about at least a portion of the stretching rod means that the stretching rod is enclosed in the cleaning chamber over at least a part of its length. By placing the stretching rod into the cleaning chamber and injecting a cleaning fluid therein, the stretching rod is cleaned in a simple and quickly-executed manner.

Moreover, this is advantageous in that the stretching rod is cleaned without substantially impeding the production of containers. The provision of the cleaning chamber means that the cleaning fluid is maintained separate from the fluid injected into the preform to form and fill the container, the stretching rod being surrounded by the cleaning fluid when retracted from the finished container at the end of a fabrication cycle.

Furthermore, by the circulation of a fluid through the cleaning chamber during the operation of the injection apparatus, the conditions under which the stretching rod is kept when in the retracted position are controlled. This will hinder the growth of microorganisms on the stretching rod during the operation of the injection apparatus and promote the overall cleanliness of the injection-molding apparatus.

In a possible embodiment, the injection head is further provided with at least one cleaning chamber valve, the at least one cleaning chamber valve being disposed so as to selectively establish fluid communication through the nozzle between the cleaning chamber and a region adjacent to the nozzle outside the injection head.

This is advantageous in that the opening of the cleaning chamber valve will effectively add another port in communication with the cleaning chamber. This enables the user to further adjust the flow rate and direction of the cleaning fluid so as to achieve an optimal cleaning of the container-fabricating apparatus.

Preferably, the injection head further comprises a substantially tubular displacement sleeve disposed coaxially about the stretching rod and translatably mobile relative thereto, the displacement sleeve having an inside diameter generally greater than the outside diameter of the stretching rod such that where the displacement sleeve is disposed about the stretching rod an interstitial space is defined between them, the displacement sleeve further comprising a sealing means disposed at a first end thereof configured such that a seal is created where the stretching rod engages the sealing means, thereby constituting the cleaning chamber valve, and at least one circulation orifice establishing fluid communication between the interstitial space and the cleaning chamber, the at least one circulation orifice being disposed in a second end of the displacement sleeve opposite the first end.

Thanks to the provision of the interstitial space between the displacement sleeve and the stretching rod, and the at least one circulation orifice establishing fluid communication between the interstitial space and the rest of the cleaning chamber, both the stretching rod and the inner and outer surfaces of the displacement sleeve are in fluid communication with the rest of the cleaning chamber. Thus when a cleaning fluid is circulated through the cleaning chamber, the stretching rod and displacement sleeve will be cleaned in the flow of the cleaning fluid.

In a preferred embodiment, at least one of the cleaning chamber ports is disposed at an extremity of the cleaning chamber and at least one other of the cleaning chamber ports is separated from the at least one port at the extremity by a distance equal to at least half the length of the cleaning chamber.

This is advantageous in that separating the cleaning chamber ports along the length of the cleaning chamber in this way will promote the circulation of a cleaning fluid injected into the cleaning chamber. Specifically, by injecting the cleaning fluid at one end and extracting it further down the cleaning chamber, stagnant areas in the flow of the cleaning fluid through the injection head are minimized and the efficiency of cleaning is further improved.

Advantageously, the length of the cleaning chamber is at least 35 centimeters.

This is advantageous in that 35 centimeters is approximately the height of a typical two-liter beverage container; providing the cleaning chamber in a length of at least 35 centimeters means that when the stretching rod is retracted into the injection head, the entire length thereof which is inserted into the container during the forming process will be disposed in the cleaning chamber. This holds true for smaller container sizes, since in such cases the stretching rod is not advanced as far into the container.

The cleaning of the stretching rod is thereby rendered more efficient and complete.

In a second aspect of the invention there is provided a method for cleaning a container-fabricating apparatus, comprising the steps of providing a container fabricating apparatus comprising an injection head configured to establish fluid communication with a substantially tubular preform through a nozzle, a stretching rod disposed at least partially within the injection head, and a cleaning chamber being at least partially defined by a hollow, elongate housing contiguous with the injection head and extending therefrom, a plurality of cleaning chamber ports being provided in a wall of the housing so as to establish fluid communication with the cleaning chamber, the stretching rod being at least partially disposed within the cleaning chamber; retracting the stretching rod into a substantially retracted position such that the portion of the stretching rod which previously projected from the injection head is substantially disposed within the cleaning chamber; and filling the cleaning chamber with a purified gas, the purified gas being introduced through at least one of the cleaning chamber ports and being retained in the cleaning chamber.

This is advantageous in that the filling and retention of the purified gas within the cleaning chamber ensures that the conditions within the cleaning chamber are held constant. By controlling the conditions within the cleaning chamber, the occurrence of undesirable conditions within the cleaning chamber and on the surface of the stretching rod, e.g. bacteria growth, may be minimized.

In a preferred embodiment, the injection head further comprises a substantially tubular displacement sleeve disposed coaxially about the stretching rod and translatably mobile relative thereto, the displacement sleeve having an interior diameter generally greater than the outside diameter of the stretching rod such that where the displacement sleeve is disposed about the stretching rod an interstitial space is defined between them, the displacement sleeve further comprising a sealing means disposed at a first end thereof configured to accommodate the stretching rod such that a seal is create where the stretching rod is disposed within the displacement sleeve, thereby constituting the cleaning chamber valve, and at least one circulation orifice establishing fluid communication between the interstitial space and the cleaning chamber, the at least one circulation orifice being disposed in a second end of the displacement sleeve opposite the first end, such that during the retracting step the at least one circulation orifice is disposed within the cleaning chamber, and such that during the filling step the interstitial space is filled with the purified gas.

This is advantageous in that the atmosphere within the interstitial space between the displacement sleeve and the stretching rod is maintained under controlled conditions, thanks to the circulation orifices disposed within the displacement sleeve.

This will hinder the development of undesirable microorganisms on the displacement sleeve as well as upon the stretching rod, improving the cleanliness of the apparatus during its operation.

Preferably, during the filling step a first portion of the purified gas is discharged from another one of the cleaning chamber ports and a second, subsequently-introduced portion of the purified gas is retained within the cleaning chamber.

This is advantageous in that the discharge of the first portion of the purified gas serves to flush the cleaning chamber, driving out any condensation or other such residues which are present in the cleaning chamber and interstitial space or upon the stretching rod or displacement sleeve. This further improves control which the user may exercise upon the conditions within the cleaning chamber and interstitial space.

In a third aspect of the invention there is provided a method for cleaning a container-fabricating apparatus, comprising the steps of providing a container fabricating apparatus comprising an injection head configured to establish fluid communication between an injection fluid port and a mouth of a substantially tubular preform through a nozzle of the injection head, a stretching rod disposed at least partially within the injection head, coaxial with the nozzle, and projecting at least partially from the injection head, a cleaning chamber being at least partially defined by a hollow, elongate housing contiguous with the injection head and extending therefrom, a plurality of cleaning chamber ports being provided in a wall of the housing so as to establish fluid communication with the cleaning chamber, the stretching rod being at least partially disposed within the cleaning chamber, and a substantially tubular displacement sleeve disposed coaxially about the stretching rod and translatably mobile relative thereto, the displacement sleeve having an interior diameter generally greater than the outside diameter of the stretching rod such that where the displacement sleeve is disposed about the stretching rod an interstitial space is defined between them; extending the stretching rod and the displacement sleeve through the nozzle into a substantially cup-shaped receiving device, the receiving device being disposed in fluid communication with the nozzle and comprising a redirection baffle configured to deflect a flow of liquid entering the receiving device; opening a cleaning chamber valve, thereby establishing fluid communication between the cleaning chamber and the nozzle; injecting a volume of a first cleaning fluid into at least one port selected from the group comprising the cleaning chamber ports and the injection port, the volume of cleaning fluid flowing through the injection head, the cleaning chamber, and the interstitial space via at least one circulation orifice disposed in the second end of the displacement sleeve, the volume of cleaning fluid being subsequently drained through at least one other port selected from the group comprising the cleaning chamber ports and the injection port; and filling the cleaning chamber rand interstitial space with a purified gas, the purified gas being introduced through at least one port selected from the group comprising the cleaning chamber ports and the injection port.

This is advantageous in that the volume of cleaning fluid which is circulated through the injection head will clean the interior of the injection head, through a path which connects the injection liquid port and the cleaning chamber ports through the nozzle of the injection head and the cleaning chamber valve. This ensures that the stretching rod, the displacement sleeve, and the passages in the injection head through which the injection fluid is conducted are thoroughly cleaned.

Furthermore, the filling of the cleaning chamber and interstitial space with the purified gas ensures that the cleanliness of the injection head and its components following the injection of the cleaning fluid is maintained for as long as possible after the completion of cleaning.

Preferably, during the filling step a first portion of the purified gas is discharged from one of the ports selected from the group comprising the cleaning chamber ports and the injection port, and a second, subsequently-introduced portion is retained within the cleaning chamber.

This is advantageous for the reasons previously enumerated.

In a preferable embodiment, the method further comprises a rinsing step wherein a volume of a first rinsing fluid is injected into at least one port selected from the group comprising the cleaning chamber ports and the injection port, the volume of rinsing fluid flowing through the cleaning chamber and the interstitial space though at least one circulation orifice disposed in the second end of the displacement sleeve and fluid being subsequently drained from the injection head through at least one other port selected from the group comprising the cleaning chamber ports and the injection port.

This is advantageous in that the rinsing of the injection head will remove any traces of cleaning fluid which might remain in the injection head after the cleaning fluid is drained. This prevents the contamination of any containers subsequently formed with cleaning fluid, thereby improving the safety of the cleaning method.

In a possible embodiment, the injecting step and the rinsing step are repeated in an additional injecting step for a volume of a second cleaning fluid and an additional rinsing step for a volume of a second rinsing fluid, the second injecting step and the second rinsing step both being performed prior to the filling step.

This is advantageous in that by repeating the injecting and the rinsing steps for a second cleaning and rinsing fluid, the injection head and the cleaning chamber are more thoroughly cleaned. In particular, the repetition of the injecting and rinsing steps enables the usage of different cleaning fluids, having different properties and different modes of action, in sequence, thereby permitting the user to optimize the cleaning of the injection head for the characteristics of each particular application.

In a possible embodiment, the cleaning chamber valve is formed by a seal created where the stretching rod engages a sealing means disposed in an end of the displacement sleeve opposite the at least one circulation orifice, the stretching rod being retracted from the sealing means during the opening step, and the first volume of cleaning fluid flowing through the cleaning chamber valve during the injecting step.

This is advantageous in that the opening of the cleaning chamber valve is controlled by the relative positions of the stretching rod and the displacement sleeve.

The cleaning chamber valve is thereby operated with the control systems which are already present to operate the stretching rod and displacement sleeve, simplifying the construction of the apparatus. Furthermore, by configuring the stretching rod and displacement sleeve in this way, the cleaning chamber valve is provided in a compact form, reducing the overall size of the injection head so configured.

In another possible embodiment, the receiving device further comprises a drain port configured to be selectively opened and thereby permit a fluid to be discharged through the drain port.

This is advantageous in that the provision of such a drain port increases the total surface area of the ports through which the cleaning fluid is discharged, thereby increasing the maximum flow rate of the cleaning fluid as it is injected into the cleaning head. The efficiency and thoroughness with which the injection head is cleaned is thereby improved.

Furthermore, the discharging of a portion of the cleaning fluid through the drain port will alter the flow pattern of the cleaning fluid within the receiving device. The flow of the cleaning fluid may thereby be altered so as to achieve an optimal circulation about the stretching rod and displacement sleeve, and an optimal cleaning effect as a result.

In a practical embodiment, the cleaning fluid is a liquid having a pH of between 1 and 5 or between 9 and 13.

This is advantageous in that the cleaning action provided by acidic and alkaline cleaning fluids is generally improved relative to that of neutral ones. The efficiency of the cleaning process is thereby improved.

Alternately, the cleaning fluid is steam.

This is advantageous in that the injection of steam as a cleaning fluid will have a sterilizing action upon the injection head. This will improve the sanitary conditions within the injection head and prevent contamination of the containers produced by it.

DETAILED DESCRIPTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention and do not limit the scope of the invention when taken into consideration with the claims and the following detailed description.

In the present description, the following words are given a definition that should be taken into account when reading and interpreting the description, examples and claims:

"Cleaning Fluid" is a liquid or gaseous substance which has a detergent, surfactant, degreasing, solvent, sterilizing, or similar cleaning activity upon the substrate with which it is in contact;

"Purified Gas" is any gaseous mixture which has been filtered or otherwise treated so as to be substantially free from particulate matter and other such contamination; and "Rinsing Fluid" is a liquid or gaseous substance which disengages and removes any traces of Cleaning Fluid from a substrate.

As used in this specification, the words "comprises", "comprising", and similar words, are not to be interpreted in an exclusive or exhaustive sense. In other words, they are intended to mean "including, but not limited to."

Any reference to prior art documents in this specification is not to be considered an admission that such prior art is widely known or forms part of the common general knowledge in the field.

The invention is further described with reference to the following examples. It will be appreciated that the invention as claimed is not intended to be limited in any way by these examples.

The main principle of the invention is first described.

Figure 1:
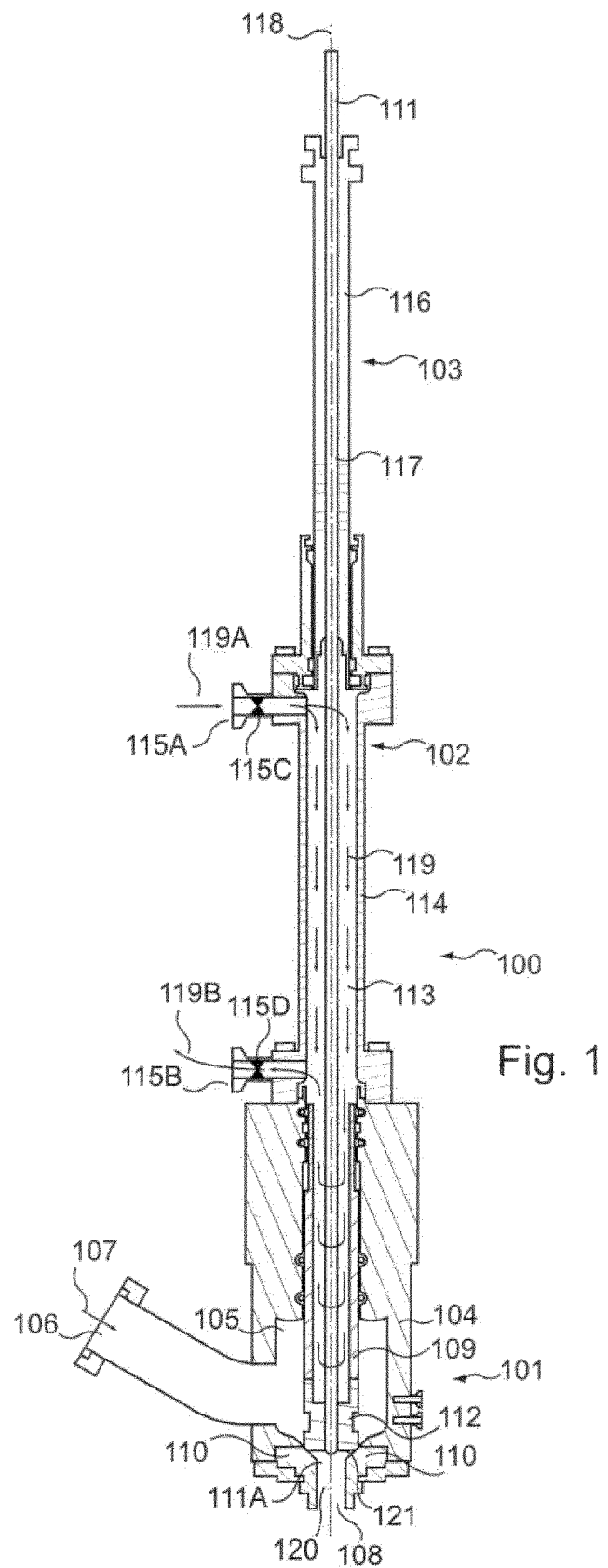
FIG. 1 is a side section view of an injection apparatus according to a first embodiment of the invention.

FIG. 1 is a side section view of an injection apparatus 100 according to a first embodiment of the invention. The injection apparatus 100 globally comprises three sections: an injection head section 101, a cleaning chamber section 102, and a guide section 103. The construction, operation, and interaction of these three sections will be discussed.

The injection head section 101 is globally configured to engage with a preform (not shown) which is expanded into a container during normal operation of the injection apparatus 100. The injection head section 101 is comprised of the valve body 104, which is substantially hollow and thus defines the valve chamber 105. The valve body 104 is furnished with an injection fluid port 106, which communicates with the valve chamber 105. In ordinary operation, the injection liquid 107 is introduced into the valve chamber 105 through the injection fluid port 106.

The valve chamber 105 is further provided with a nozzle 108, which is configured to engage with a mouth of the preform and create a seal therewith. The nozzle 108 is configured to be in fluid communication with the nozzle cavity 105, such that an injection of the injection liquid 107 into the injection fluid port 106 will flow out through the nozzle 108 and into the preform in communication therewith.

There is further provided in the valve chamber 105 the injection valve 109. The injection valve 109 is here provided in a globally-cylindrical form configured to seat upon the valve seats 110 so as to block fluid communication between the nozzle 108 and the valve chamber 105. The injection valve 109 is translatably mobile, being selectively retracted from the valve seats 110 so as to permit the injection liquid 107 to flow through the nozzle 108 and into the preform as mentioned above.

Furthermore, disposed in the injection valve 109 is the stretching rod 111, depicted here in a substantially-retracted position. The stretching rod 111 is disposed coaxially with and translatably mobile relative to the injection valve 109, being borne by the valve plug 112 disposed at the end of the injection valve 109 which engages the valve seats 110. During the fabrication of a container, the stretching rod 111 is advanced through the nozzle 108 and into the expanding preform, assuming a substantially-extended position wherein the length of the stretching rod 111 protruding from the nozzle 108 is substantially equal to the height of the container so formed.

It should be noted that the body of the injection valve 109 is substantially tubular, such that aside from the valve plug 112 through which the stretching rod 111 is conducted, the injection valve 109 defines a portion of a cleaning chamber 113 through which the stretching rod 111 is conducted.

The cleaning chamber section 102 is disposed upon injection head section 101 on a distal end opposite the nozzle 108. The cleaning chamber section 102 is comprised of a substantially-cylindrical cleaning chamber housing 114 encloses the majority of the cleaning chamber 113, and is as such in communication with the interior of the injection valve 109. The cleaning chamber section 102 is further provided with two cleaning chamber ports 115A & 115B. The cleaning chamber ports 115A & 115B establish fluid communication across the cleaning chamber housing 114 with the cleaning chamber 113. The cleaning chamber ports 115A & 115B thus permit the injection and discharge of fluids into the cleaning chamber 113.

The communication across the cleaning chamber ports 115A & 115B is regulated by the port valves 115C & 115D, respectively. The cleaning chamber ports 115A & 115B are plumbed to a supply manifold (not shown), configured to selectively deliver to the cleaning chamber ports 115A & 115B a purified gas or a cleaning fluid. The manifold is also configured to permit a purified gas or cleaning fluid to drain from either or both of the cleaning chamber ports 115A & 115B. The cleaning chamber ports 115A & 115B are thereby configured to permit the injection or draining of multiple fluids, the flow through each of the cleaning chamber ports 115A & 115B being selectively moderated by the port valves 115C & 115D, respectively. The precise configuration of the supply manifold may be determined by one skilled in the art as necessary for the application in question.

The guide section 103 is disposed on a distal end of the cleaning chamber section 102, opposite the injection head section 101. The guide section 103 comprises a substantially cylindrical guide 116 which defines an end of the cleaning chamber 113 and in which is provided a stretching rod channel 117 in which the stretching rod 111 is conducted.

The stretching rod 113 is thus guided in its motions along the longitudinal axis 118 by the stretching rod channel 117 of the guide 116 and the valve plug 112 of the injection valve 109, independently of the motion of the injection valve 109. Means for effectuating this movement are here omitted for clarity, but it should be understood that the injection valve 109 and the stretching rod 111 may be put into motion by means known in the art of machine design and automation. Preferably brushless servomotors are employed for this purpose, but other means such as electromagnetic, pneumatic, or hydraulic actuators may be appropriate depending on the particular implementation.

Furthermore, it will be readily apparent that where components of the injection head slide, rotate, or otherwise move about or upon each other, it may be necessary to furnish seals or other such members to maintain the sealed nature of the internal cavities of the injection head. Insofar as such means are in fact depicted in these figures, it should be understood that they are purely exemplary. The sealing members may thus be altered, supplemented, or replaced by such means by one skilled in the art, as deemed appropriate for the particular configuration of the injection apparatus.

At the commencement of a cleaning process, the port valves 115C and 115D are opened. A purified gas 119A enters through the cleaning chamber port 115A. As it is injected, the purified gas 119 fills the cleaning chamber 113 as shown.

Preferably, the cleaning chamber ports 115A & 115B are disposed in the cleaning chamber housing 114 as far from each other as possible, or at least separated by a distance equal to half the length of the cleaning chamber 113 as depicted in FIG. 1.

This separation prevents the formation of stagnant spots in the cleaning chamber 113 during the injection of the purified gas 119. The user will be able to determine the precise separation of the cleaning chamber ports to achieve optimal cleaning for each particular application.

The purified gas 119 is preferably filtered air, most preferably one which has been sterilized or otherwise treated so as to hinder the growth of microorganisms therein. This is particularly desirable in that air is readily available and may be purified according to known methods. However, other gases such as nitrogen, carbon dioxide, ozone, or a mixture of gases, may alternatively be used as appropriate to the application. Further conditioning means, such as for regulating the temperature and humidity of the gas, may also be employed.

Initially, the port valve 115D is open as the purified gas 119A is injected, resulting in a portion of the purified gas 119 being exhausted from the cleaning chamber port 115B, shown here as the exhausted gas 119B. Ideally, a portion of the purified gas 119 is thereby "blown through" the cleaning chamber; this will purge the cleaning chamber 113 of any condensation, vapor, or other foreign substances which may have accumulated therein.

After the purified gas 119 has filled the cleaning chamber 113 and a predetermined amount of the exhausted gas 119B has been admitted from the cleaning chamber port 115B, the port valve 115D is closed. The injection of the purified gas 119A continues until the pressure within the cleaning chamber 113 is raised to a predetermined value.

A volume of purified gas 119 is thus retained within the cleaning chamber 113, providing an atmosphere of controlled composition within the cleaning chamber 113.

This serves to hinder the growth of microorganisms within the cleaning chamber 113 and upon the surface of the stretching rod 111, particularly during the operation of the injection apparatus 100.

Furthermore, while it is shown here that the purified gas 119A is injected into one cleaning chamber port 115A and discharged as the exhausted gas 119B through another cleaning chamber port 115B, the injection apparatus 100 as shown in FIG. 1 further comprises a cleaning chamber valve 120 which may be opened so as to provide a further means by which the purified gas 119 may be discharged. The cleaning chamber valve 120 is formed where the stretching rod 111 passes through the valve plug 112 and into the nozzle 108; by retracting the stretching rod 111 from the valve plug 112, the plug channel 121 is opened to permit the purified gas 119 to be discharged through the nozzle 108. This has the added benefit of cleaning the tip 111A of the stretching rod 111, which would otherwise remain out of the flow of the purified gas 119.

The stretching rod 111 is thereby cleaned while preventing the purified gas 119 from flowing into the valve chamber 105. The cleaning process as depicted in FIG. 1 is therefore ideal for use while the injection apparatus 100 is in operation, i.e. when the injection liquid 107 is present therein, the cleaning chamber 113 being configured so as to be essentially air-tight.

Ideally, the purified gas 119 is exchanged, or at least refreshed, at regular intervals, for instance after the fabrication of each container is completed. This will prevent the buildup of humidity and other undesirable substances in the cleaning chamber and maintain the purified gas 119 within a desired temperature range. This maintains the conditions within the cleaning chamber 113 as consistent as possible over a given period of time (e.g. a factory production cycle).

Also, it should be noted that a cleaning chamber valve may be provided in a form that is different from that depicted here. For instance, the cleaning chamber valve may be disposed in the side of the portion of the injection valve 109 which projects into the injection cavity 105, for instance in the form of a sleeve valve. Alternately, the cleaning chamber valve may be provided within the valve body 104. The precise configuration may be determined by the user as appropriate to each particular application.

Figure 2:
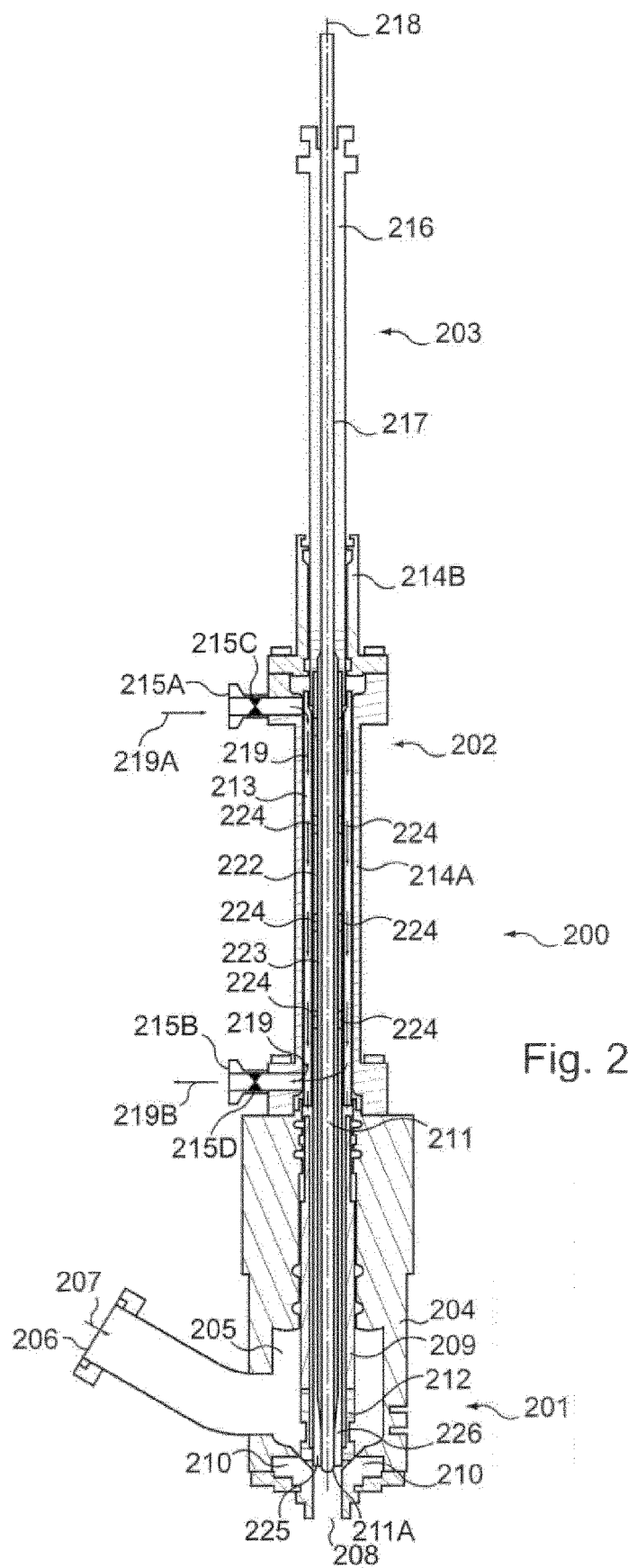
FIG. 2 is a side section view of an injection apparatus according to a second embodiment of the invention.

FIG. 2 depicts an injection apparatus 200 according to a second embodiment of the invention. The injection apparatus 200 is broadly constructed in the same way as the injection apparatus 100 of FIG. 1, comprising an injection head section 201, a cleaning chamber section 202, and a guide section 203.

As in the previous embodiment, the injection head section 201 is globally configured to engage with a preform (not shown) at the nozzle 208, so as to ultimately expand the preform into a container. The injection head section 201 is primarily comprised of the valve body 204 which defines the valve chamber 205. The valve body 204 is furnished with an injection fluid port 206, which communicates with the valve chamber 205. During the fabrication of a container, the injection liquid 207 is introduced into the valve chamber 205 through the injection fluid port 206.

Within the valve chamber 205 is the injection valve 209, there is provided the injection valve 209 which seats against the valve seats 210 at the valve plug 212, and is mobile as in the previous embodiment so as to selectively permit the injection liquid 107 to flow through the nozzle 208. There is further provided the stretching rod 211, which is translatably mobile relative to the injection valve 209 and which functions substantially as described in the previous embodiment.

The cleaning chamber section 202 is disposed upon the injection head section 101 on a distal end opposite the nozzle 208. A cleaning chamber 213 is defined partially by the interior of the injection valve 209 and partially by the cleaning chamber housing 214A and an end cap 214B. There are further provided two cleaning chamber ports 215A & 215B which communicate across the walls of the cleaning chamber housing 214A. As in the previous embodiment, flow through the cleaning chamber ports 215A & 215B is regulated by the port valves 215C & 215D, respectively.

In the guide section 203, there is provided the substantially cylindrical guide 216, in which is provided a stretching rod channel 217 in which the stretching rod 211 is conducted. The stretching rod 211 is thereby rendered slideably mobile along the longitudinal axis 218, such that it may extend through the nozzle 208 during the operation and cleaning of the injection apparatus 200.

The injection apparatus 200 of the present embodiment is distinguished from that of the previous embodiment by the presence of the displacement sleeve 222. The displacement sleeve 222 is disposed about the stretching rod 211, extending through the cleaning chamber 213 from the guide 216 to the valve plug 212. The displacement sleeve 222 is substantially annular in cross-section, having an inside diameter greater than the outside diameter of the stretching rod 211. Where the displacement sleeve 222 is disposed about the stretching rod 211, the interstitial space 223 is thereby defined.

The displacement sleeve 222 is preferably attached to the guide 216, which is in turn configured so as to be slideably mobile relative to the end cap 214B of the cleaning chamber 213. In this way, the displacement sleeve 222 is rendered mobile along the longitudinal axis 218, independent to the motion of both the injection valve 209 and the stretching rod 211.

The displacement sleeve is further provided with a plurality of circulation orifices 224, disposed in the portion of the displacement sleeve 222 which is generally opposite the nozzle 208. The circulation orifices 224 here are in the form of perforations in the displacement sleeve 224, but may be in any form which permits fluid communication between the interstitial space 223 and the rest of the cleaning chamber 213.

At the end of the displacement sleeve 222 proximal to the nozzle 208 when in the retracted position depicted here is disposed the sealing collar 225. The sealing collar 225 is an area of locally-reduced inside diameter of the stretching rod 222, such that a seal is created at the interface between the two.

This combination constitutes the cleaning chamber valve 226. When the stretching rod tip 211A is retracted upwards into the displacement sleeve 222, the cleaning chamber valve 226 is opened and fluid communication is established through the displacement sleeve 222 with the cleaning chamber 213. When the displacement sleeve 222 is disposed in the retracted position as shown here, any purified gas 119 being discharged from the cleaning chamber valve 226 will issue through the nozzle 208.

Thus, during a cleaning cycle a volume of purified gas 219A is injected into the cleaning chamber port 215A, in the same way as the previous embodiment. The purified gas 219 will circulate through the cleaning chamber 213 and the interstitial space 223, before being eventually exhausted through the cleaning chamber port 215B.

As in the previous embodiment, it may be advantageous to permit some of the purified gas 219 to "blow through" the cleaning chamber 213 and interstitial space 223 before closing the port valve 215D. Alternately, the port valve 215D may be kept closed throughout the filling of the cleaning chamber 213 and the interstitial space 223 with the purified gas 219, such that the entirety of the purified gas 219A injected into the cleaning chamber port 215A is retained in the cleaning chamber 213.

Figure 3:
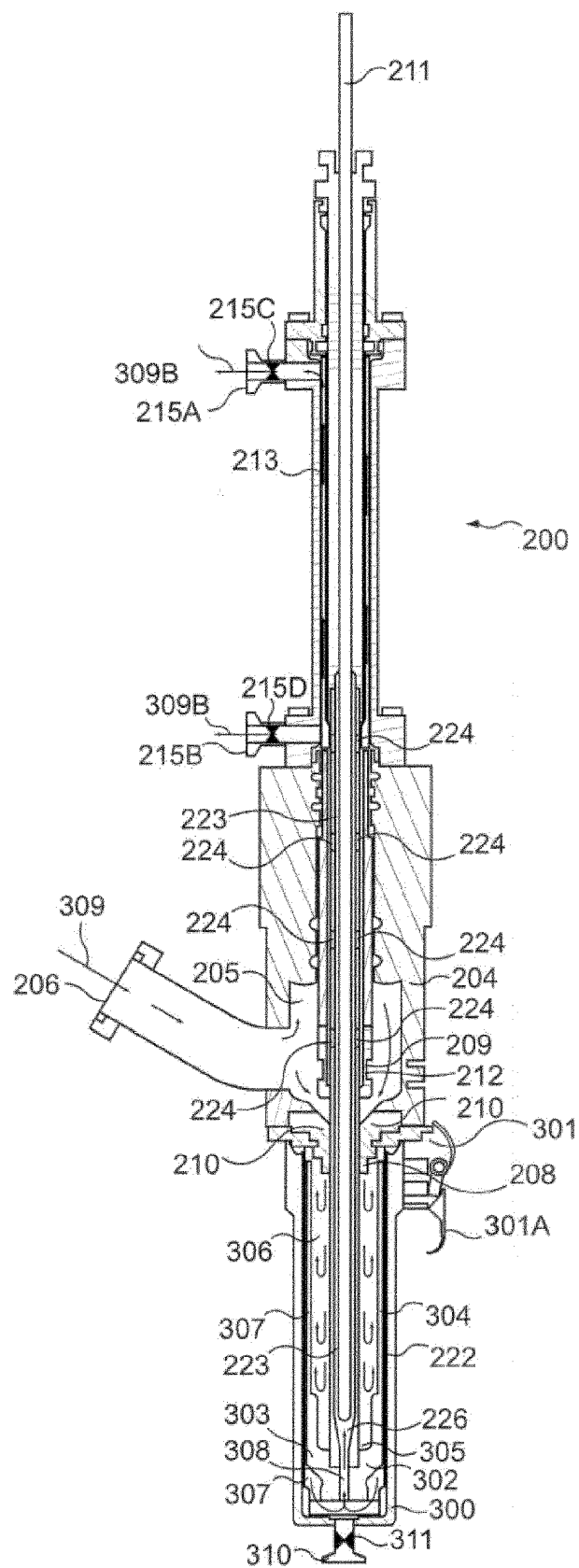
FIG. 3 is a side section view of the injection apparatus of FIG. 2 and a receiving device attached to the injection head.

FIG. 3 depicts the injection apparatus 200 of FIG. 2 fitted with a receiving device 300. It should be noted that in FIGS. 1 and 2 the injection apparatuses 100 & 200 therein were depicted as configured for a first cleaning method, in which the injection valve is closed and there is no communication between the cleaning chamber and the valve cavity of the injection head. Such a process is, as discussed above, ideal for the injection of a purified gas into the cleaning chamber, performed during the production of containers.

FIG. 3, however, depicts the injection apparatus 200 as configured for a second cleaning method, wherein the injection valve 209 is opened, as depicted here, and the valve chamber 205 and injection fluid port 206 are incorporated into the circuit through which a cleaning fluid flows. This method will now be described.

The receiving device 300 is a substantially cup-shaped object, being affixed to the valve body 204 so as to create a seal therewith, and surrounding the nozzle 208. The receiving device 300 is here attached by the use of a spring clip 301A, which when in the locked position bears against the cleat 301B provided on the valve body 204.

However, other means such as threads, bayonet fittings, or the like may be employed to hold the receiving device 300 to the valve body 204 and maintain the seal between the two. Preferably, the means employed permit the redirection device 300 to be attached and a seal created by hand, and without tools.

Within the receiving device 300 is the baffle 302, which is comprised of the baffle end 303 and the baffle extension 304. The baffle end 303 is a substantially disc-shaped insert, comprising a baffle seat 305 configured such that the end of the displacement sleeve will lodge therein. The baffle extension 304 extends from the perimeter of the baffle seat 305 nearly to the nozzle 208. This defines the baffle cavity 306 within the baffle 302, and a redirection channel 307 between the baffle 302 and the interior surface of the redirection device 300. The baffle end 303 is further provided with the baffle channel 308, which establishes fluid communication between the baffle seat 305 and the redirection channel 307. The receiving device 300 is preferably generally cylindrical in shape, but may be provided in any form appropriate to the application which maintains the essential topography and function described here.

As depicted here, the stretching rod 211 and the displacement sleeve 222 are disposed in a substantially extended position, projecting through, but not obstructing, the nozzle 208 and into the receiving device 300. The injection valve 209 is retracted from the valve seats 210, thereby establishing fluid communication between the valve chamber 205 and the baffle cavity 306 through the nozzle 208.

The end of the displacement sleeve 222 is advanced into the baffle seat 305 as shown here, and the stretching rod 211 retracted slightly so as to open the cleaning chamber valve 226. The interstitial space 223 between the stretching rod 211 and the displacement sleeve 222 is thereby placed in fluid communication with the nozzle 208 via the redirection channel 307.

During a cleaning operation, a volume of a cleaning fluid 309 is injected through the injection fluid port 206. The cleaning fluid 309 is provided by a fluid source (not shown) coupled to the injection apparatus. This fluid source is configured such that one may selectively inject through the injection fluid port 206 a volume of injection fluid or a volume of the cleaning fluid 309; or alternately receive a flow of a fluid issuing from the injection fluid port 206 and discharge it through a drain means.

The apparatus 200 is, as noted above, provided with the port valves 215C & 215D, which control the flow through the chamber ports 215A & 215B. As in the embodiment previously discussed, the apparatus 200 is preferably further provided with a supply manifold (not shown). The supply manifold is configured to selectively establish communication with any or all of the chamber ports 215A & 215B and the injection fluid port 206, providing a means for the introduction and extraction of a purified gas and/or the cleaning fluid through the ports 206 and 215A & 215B by creating connections with a supply and drain (not shown) of the purified gas and/or cleaning fluid.

The supply manifold is thus preferably configured such that one may select between a purified gas and a cleaning fluid, selectively inject it into the apparatus 200 through at least one of the ports 206, 215A, and 215B, and selectively discharge it through at least one other of the ports 206, 215A, and 215B. Such a manifold, and the control means necessary to put it into operation, may be provided by one knowledgeable in the art.

When injected through the cleaning fluid 309 will flow into the valve chamber 205 and through the nozzle 208 into the baffle cavity 306. Once in the baffle cavity 306, the cleaning fluid 309 circulates about the exterior surface of the displacement sleeve 222 before being redirected upwards, past the baffle extension 304 and through the redirection channel 307. From the redirection channel 307, the cleaning fluid 309 continues up the interstitial space 223 between the stretching rod 211 and the displacement sleeve 222, into the cleaning chamber 213 through the plurality of circulation orifices 224 disposed in the displacement sleeve 222. The cleaning fluid 219 then circulates in the cleaning chamber 213 about the outer surface of the displacement sleeve 222 before being finally discharged through the cleaning chamber ports 215A & 215B as the exhausted cleaning fluid 309A & 309B, respectively.

Once the cleaning fluid 219 is discharged, the cleaning chamber 213 and the interstitial space 223 are filled with a purified gas, in the same fashion as discussed above. Preferably, this involves letting a portion of the purified gas "blow through" the cleaning chamber 213 and the interstitial space 223 before closing the port valves 215C & 215D, so that any traces of cleaning fluid are expelled from the cleaning chamber 213 and the interstitial space 223. The cleaning chamber 213 and the interstitial space 223 are in this way cleaned by the cleaning fluid 219, and then subsequently placed in an atmosphere which maintains this cleanliness thanks to the presence of the purified gas.

In this way, the surfaces of the internal passages of the injection apparatus 200 are bathed in the flow of cleaning fluid 309, as well as the surface of the stretching rod 211. The surface of the displacement sleeve 222 is also entirely cleaned save for the portion disposed within the valve plug 212 of the injection valve 209; this may be easily accounted for by, for instance, retracting the displacement sleeve slightly at the end of the end of the injection of cleaning fluid 309 so as to expose it to the flow of the cleaning fluid 309.

Furthermore, it should be noted that in this embodiment the receiving device 300 is further provided with a drain port 310 equipped with a drain valve 311. When opened, the drain valve 311 will permit a portion of the cleaning fluid 309 to be discharged through the drain port 310.

Accordingly, it will be understood that while this embodiment depicts one possible flow path for the cleaning fluid 309, other paths are certainly possible. For instance, the cleaning fluid may be injected through the cleaning chamber ports and discharged through the injection fluid port and the drain port, and so on. By selecting which port or ports are used for injecting the cleaning fluid and which are used for discharging the cleaning fluid, one may adapt the flow of the cleaning fluid through the apparatus to achieve a cleaning action of maximum efficiency.

The process may also be repeated with such variations, to achieve a more complete cleaning of the injection apparatus. For example, it may be desirable to inject a disinfecting cleaning fluid in the flow pattern described above in a first cleaning cycle, and then in a second cleaning cycle inject a non-toxic cleaning fluid in an opposing flow pattern. This will flush the cleaning fluid from the injection head, reducing the likelihood that a container subsequently produced is contaminated with cleaning fluid.

The range of cleaning fluids which may be used is thereby expanded, improving the capacity and efficacy of the cleaning process.

Preferably, the cleaning fluids used are acidic or alkaline; having a pH between 1 and 5 or between 9 and 13, respectively. Cleaning fluids in this range tend to be more effective at cleaning and disinfection than those with pHs closer to neutral.

Furthermore, by alternating the use of acidic and alkaline cleaning fluids as mentioned above, any residues will be neutralized. This minimizes the risk of contamination in any containers fabricated and filled immediately subsequent to the cleaning of the injection apparatus 200.

Alternately, steam may be used for the cleaning fluid 309. Steam is particularly advantageous in that it is easy to furnish, will achieve sterilization of the injection apparatus 200 when used correctly, and does not leave any residues.

Depending on the nature of the cleaning fluid 309 employed, it may be also be advantageous to inject a rinsing fluid after the cleaning fluid 309, introducing it to the injection apparatus 200 through at least one of the injection port 206 or cleaning chamber ports 215A & 215B. The rinsing fluid will flush any traces of the cleaning fluid before being discharged from the injection apparatus 200 by at least one of the injection port 206 and cleaning chamber ports 215A & 215B. This minimizes the risk of contamination of the containers with any residual cleaning liquid 309.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A container-fabricating apparatus, comprising:
an injection head configured to establish fluid communication between an injection fluid port disposed in the injection head and a substantially-tubular preform disposed in communication with a nozzle of the injection head;
an injection valve located within the injection head, the injection valve being moveable between a first position preventing the flow of the injection fluid through the injection head and a second position permitting the flow of the injection fluid through the injection head;
a stretching rod disposed at least partially within the injection head, the stretching rod being mobile between a substantially extended position wherein the stretching rod projects from the injection head through the nozzle and a substantially retracted position;
a cleaning chamber at least partially defined by a hollow, elongate housing contiguous with the injection head and extending therefrom, the cleaning chamber also being at least partially defined within the injection valve in the injection head, a plurality of cleaning chamber ports being provided in a wall of the housing so as to establish fluid communication with the cleaning chamber, the stretching rod being substantially disposed within the cleaning chamber when disposed in the substantially retracted position; and
portions of the injection valve and the stretching rod defining a cleaning chamber valve, the cleaning chamber valve being disposed so as to selectively establish fluid communication through the nozzle between the cleaning chamber and a region adjacent to said nozzle outside said injection head.

2. A container-fabricating apparatus, comprising:
an injection head configured to establish fluid communication between an injection fluid port disposed in the injection head and a substantially-tubular preform disposed in communication with a nozzle of the injection head; and
a stretching rod disposed at least partially within the injection head, the stretching rod being mobile between a substantially extended position wherein the stretching rod projects from the injection head through the nozzle and a substantially retracted position;
a cleaning chamber at least partially defined by a hollow, elongate housing contiguous with the injection head and extending therefrom and at least partially defined by the injection head, a plurality of cleaning chamber ports being provided in a wall of the housing so as to establish fluid communication with the cleaning chamber, the stretching rod being substantially disposed within the cleaning chamber when disposed in the substantially retracted position;
wherein the injection head is further provided with at least one cleaning chamber valve, the at least one cleaning chamber valve being disposed so as to selectively establish fluid communication through the nozzle between the cleaning chamber and a region adjacent to said nozzle outside said injection head; and
wherein the injection head further comprises a substantially tubular displacement sleeve disposed coaxially about the stretching rod and translatably mobile relative thereto, said displacement sleeve having an interior diameter generally greater than the outside diameter of said stretching rod such that where said displacement sleeve is disposed about said stretching rod an interstitial space is defined between said displacement sleeve and said stretching rod, said displacement sleeve further comprising a sealing member disposed at a first end thereof configured such that a seal is created where said stretching rod engages said sealing member, thereby constituting the cleaning chamber valve, and at least one circulation orifice establishing fluid communication between the interstitial space and the cleaning chamber, said at least one circulation orifice being disposed in a second end of said displacement sleeve opposite said first end.

3. The apparatus as claimed in claim 1, wherein at least one of the cleaning chamber ports is disposed at an extremity of the cleaning chamber and at least one other of said cleaning chamber ports is separated from said at least one port at said extremity by a distance equal to at least half the length of the cleaning chamber.

4. The apparatus as claimed in claim 1, wherein the cleaning chamber has a length of at least 35 centimeters.

5. The container-fabricating apparatus according to claim 1, wherein the injection head defines an injection chamber communicating the injection fluid port with the nozzle, the injection valve including a cylindrical portion disposed within the injection head about the stretching rod, the cylindrical portion defining at least a portion of the cleaning chamber extending within the injection nozzle.

6. The container-fabricating apparatus according to claim 1, wherein one end of the injection valve sealingly engages the stretching rod to define the cleaning chamber valve disposed within the injection chamber.

7. The container-fabricating apparatus according to claim 6, wherein the cleaning chamber valve is disposed within the injection chamber upstream of the nozzle so as to selectively establish fluid communication between the cleaning chamber and the nozzle.

* * * * *